Patented Dec. 27, 1927.

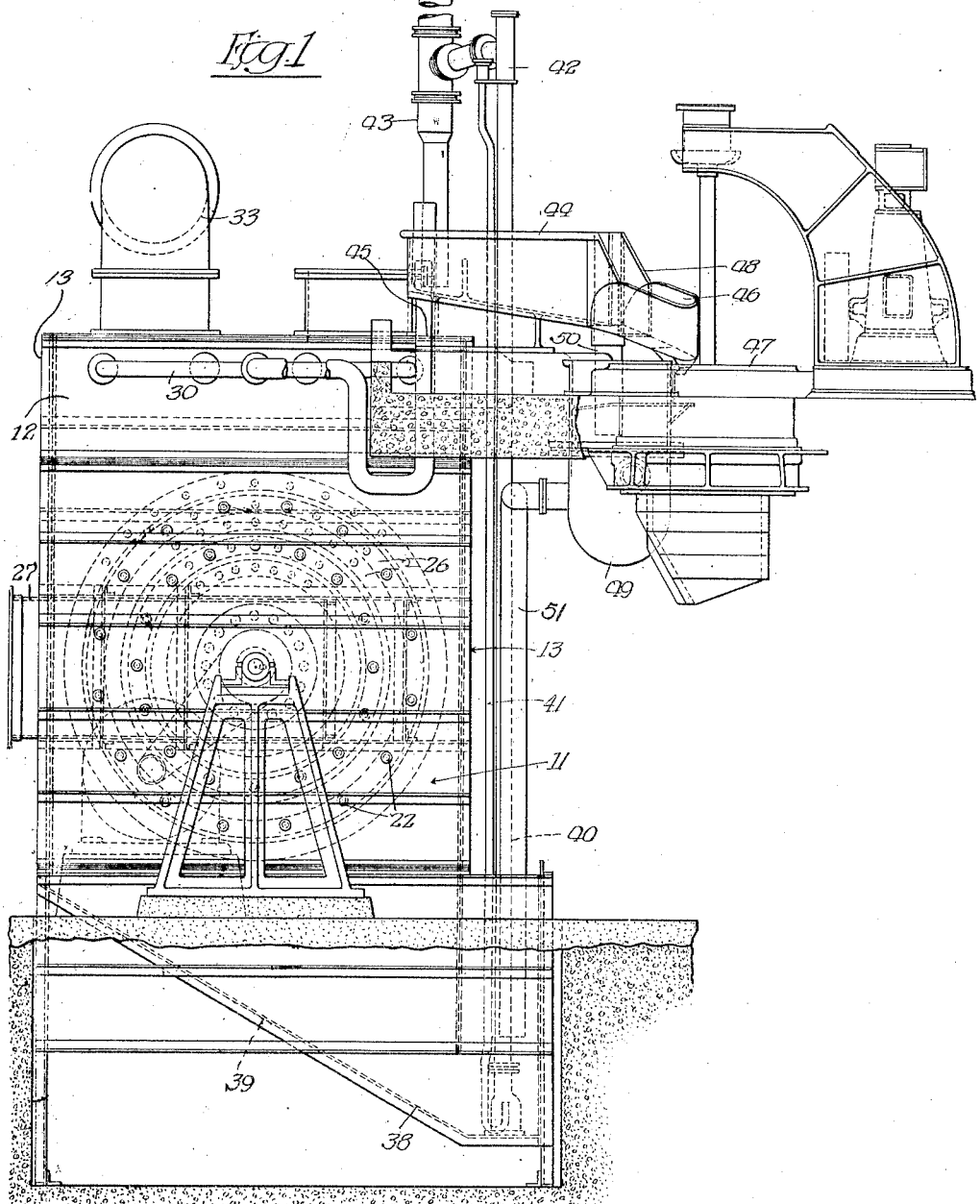

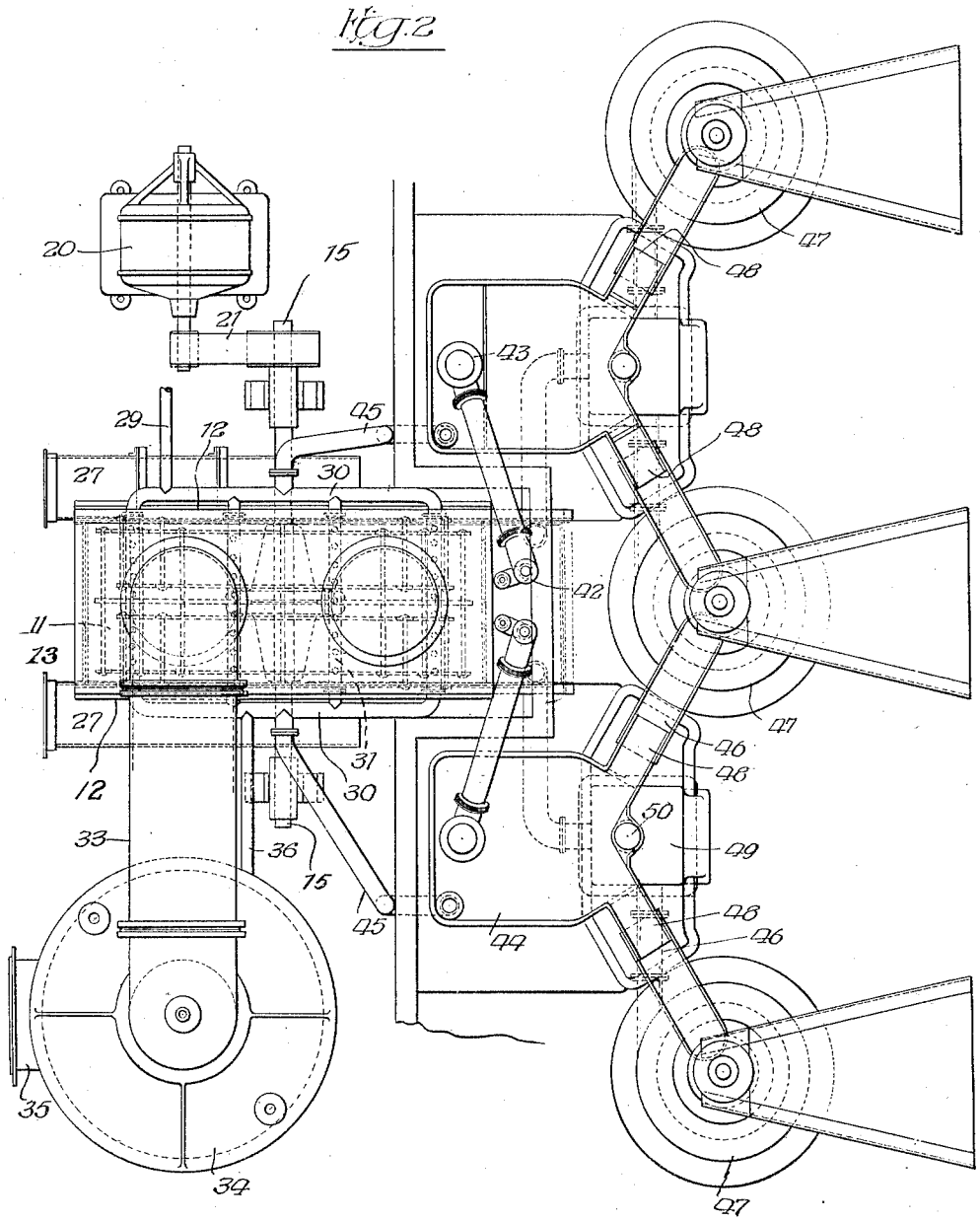

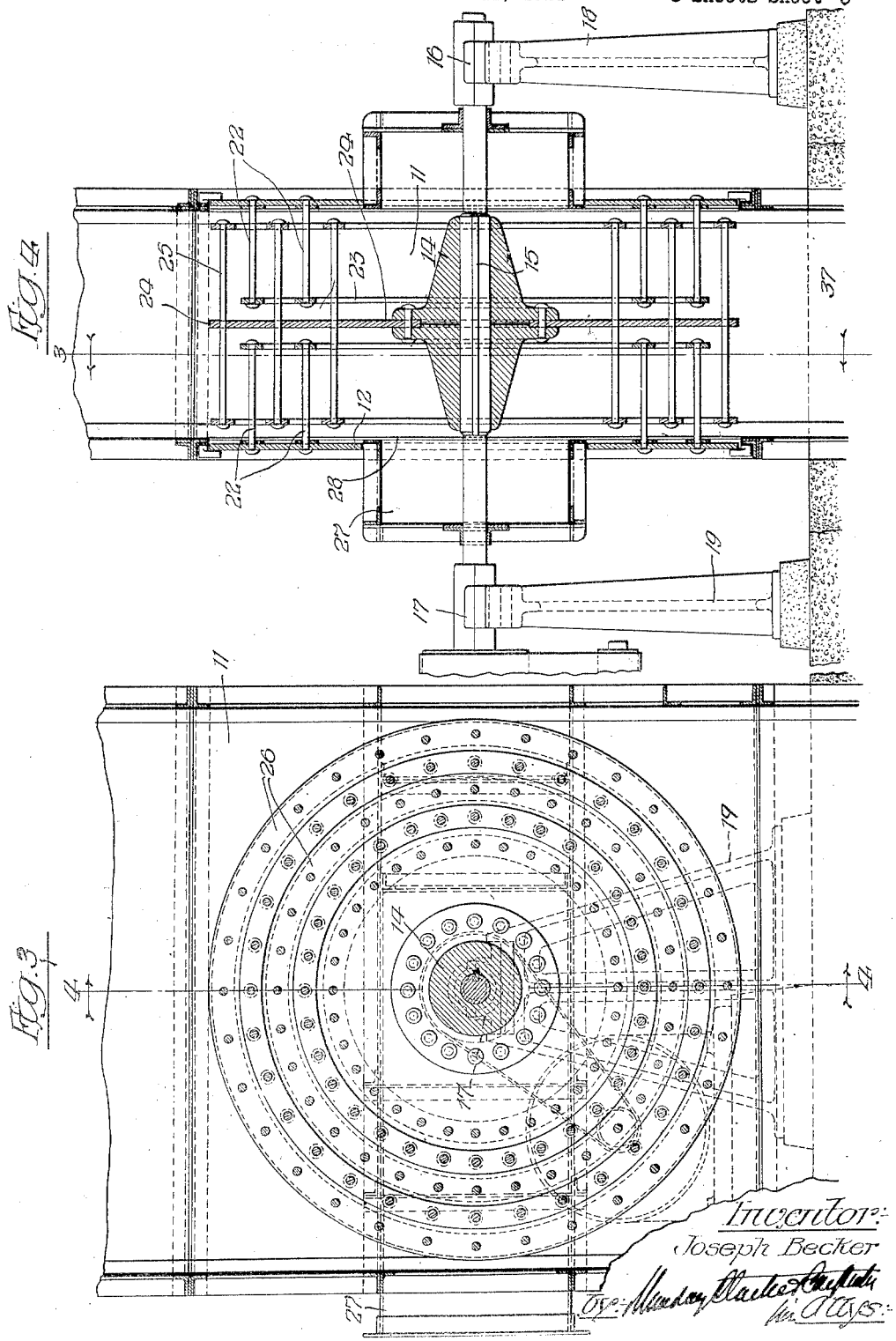

1,654,159

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA-SATURATOR APPARATUS.

Application filed February 11, 1921. Serial No. 444,102.

This invention relates to ammonia saturator apparatus for ammonia recovery from fuel gases and, in its present embodiment, the invention is of especial utility for effecting the recovery of ammonia in the form of an ammonium salt from ammonia charged gases according to the ammonia recovery process described and claimed in my Letters Patent for ammonia and tar recovery process, No. 1,375,483, dated April 19, 1921.

The invention has for an essential object to provide an efficient ammonia saturator apparatus which operates as a disintegrator saturator to whirl and to disintegrate the ammonia absorbing acid and gas into an intimate admixture from which an ammonium salt is directly precipitated, whereby the absorption of ammonia from the gas and precipitation of the ammonium salt takes place substantially concurrently in the same apparatus and the direct precipitation of the ammonium salt in the acid wash is attained. Because of the disintegrating and mixing action imparted to the absorbing acid and gas and the resultant direct precipitation of the ammonium salt, the invention eliminates the necessity for maintaining back pressure on the gas such as would be unavoidable in cases where the gas is forced through a column of acid and thus renders the ammonia recovery substantially independent of and unaffected by pressure variations of the gas. Consequently, the invention is of great importance in the treatment of gases of large volume, such as producer gas, which gases are subject to considerable variations in pressure and, because of their volume, are difficult to maintain at the proper back pressure, without resorting to expensive compressor apparatus. The invention thus greatly simplifies the recovery of ammonia from ammonia charged gases and promotes economy of such ammonia recovery regardless of the volume of gases to be treated, and also simplifies the apparatus necessary to such ammonia recovery, for example, by the elimination of separate acid washer apparatus and saturators.

In addition to the general objects recited above, the invention has for other objects such other improvements and advantages in construction and operation as are found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention to such illustrative instance or instances:

Figure 1 is an elevational view of a portion of a by-product recovery apparatus which embodies in its construction ammonia saturator apparatus constructed in accordance with the present invention;

Fig. 2 is a plan view of the apparatus illustrated in Fig. 1;

Fig. 3 is a vertical sectional view of the ammonia saturator apparatus taken in a plane indicated by the line 3—3 of Fig. 4; and Fig. 4 is another vertical sectional elevation of the ammonia saturator apparatus taken in a plane indicated by the line 4—4 of Fig. 3.

The same characters of reference designate the same parts throughout the several views of the drawings.

In the embodiment illustrated in the drawings, the invention is incorporated in a by-product recovery apparatus for the absorption of ammonia from ammonia charged gases and direct precipitation of ammonia in the form of an ammonia salt, such as is described and claimed in my Letters Patent No. 1,375,483, hereinabove mentioned, and the invention is illustrated in connection with other apparatus for handling the precipitated ammonia salt and for recovering from such precipitated salt the excess absorbing-acid. For convenience, the present description will be confined to the present illustrated embodiment of the invention in such by-product recovery apparatus; the novel features and improvements made by the invention are susceptible of other applications, for example in other by-product recovery apparatus and in the treatment of any ammonia charged gas to effect recovery of the ammonia; hence, the scope of the invention is not confined to the specific use and specific embodiment herein described as an illustrative example.

Referring to the drawings: there are illustrated views of a portion of by-product apparatus having features above specified; said by-product apparatus embodies in its construction ammonia saturator apparatus made in accordance with the present invention, and an apparatus for handling the precipitated ammonia salt and for effecting recovery of the excess ammonia-absorbing acid solution and returning the recovered acid solution to the ammonia saturator apparatus.

The ammonia saturator apparatus comprises a suitable tank 11, in the present instance substantially rectangular in form, the side and end walls 12, 12 and 13, 13 of which are constructed of appropriate metal panelling as shown. Mounted within the tank 11 is a rotor 14 disposed with its axis of rotation parallel to the end walls 12 of the tank. The shaft 15 of the rotor extends through the opposite side walls 12, 12 of the tank and is supported on the opposite sides of the tank by bearings 16, 17 mounted at the tops of suitable supporting pedestals 18 and 19. An electric motor 20 is provided for driving the shaft 15 and its rotor 14, and for this purpose, the electric motor is operatively connected with the shaft 15 by means of suitable belt and pulley mechanism, designated generally by the reference character 21 in Fig. 2.

Secured respectively to the opposite side walls 12, 12 of the tank are fixed disintegrator members or devices 22. These fixed disintegrator members are, according to the present embodiment of the invention, in the form of rods arranged in a plurality of spaced curvilinear series and projecting inwardly into the tank oppositely from the side walls to which these rods are secured, as shown in Figs. 3 and 4. Each side wall 12 has secured thereto two concentric circular series of such disintegrator rods 22, one series of which is spaced from the other series for purposes which will be hereinafter explained. That is to say, the series of disintegrator members that are attached to each side wall 12 of the tank are arranged in two concentric circular paths one circular series being of greater diameter than the other. The outer ends of each series of disintegrator members are secured to bracing rings 23, as shown.

Surrounding the rotor 14 and secured thereto, preferably at the central portion of the rotor, is a rotor disk 24. The rotor disk 24 carries the movable disintegrator members which operate conjointly with the fixed disintegrator members 22 hereinabove described. As shown, the movable disintegrator members carried by the rotor disk 24 are constituted of rods 25 secured in a plurality of curvilinear series to the rotor disk and preferably arranged in concentric circular paths of different diameters measured from the axis of rotation of the rotor. As shown in Fig. 4 the movable disintegrator members 25 of the rotor extend from opposite faces of the rotor disk 24 and are made considerably longer than the fixed disintegrator members 22, so that the movable series of disintegrator members alternate with and lap the aforesaid fixed series of disintegrator members for substantially the entire length of the latter. The opposite ends of each series of movable disintegrator members carried by the rotor 14 are braced by rings 26 secured thereto in any suitable manner.

With the above construction, there is provided within the tank or chamber 11 movable and fixed disintegrator means which operate conjointly to disintegrate the ammonia absorbing acid and ammonia charged gas introduced into said tank, into an intimate admixture from which an ammonium salt is directly precipitated, absorption of ammonia and precipitation of the ammonium salt taking place substantially concurrently in the same chamber. The ammonia charged gas, such as producer gas, is introduced into the zone or space immediately surrounding the axis of rotation of the rotor through gas inlet means 27 located on opposite sides of the tank 11 and respectively communicating with the interior of the tank through inlets 28 in the side walls 12 of the latter. The ammonia charged gas entering the tank from opposite sides of the central rotor disk 24 is whirled by centrifugal force into the zone through which the movable disintegrator members are moving rapidly past the fixed disintegrator members, and in said zone the gas is whirled and disintegrated into an intimate admixture with a supply of an ammonia absorbing acid, such as sulphuric acid, introduced into the tank from the top of the latter. The gas and acid are thus broken up into minute particles which are thoroughly mixed together, enabling the acid to effect a rapid absorption of the ammonia from the ammonia charged gas and providing a direct precipitation in the tank of an ammonium salt, such as ammonium sulphate, the heat residuum in the gas being utilized to effect the precipitation of the ammonium salt. The ammonia absorbing acid is introduced into the top of the tank 11 from a fresh acid supply line 29 which leads to a manifold 30 that is connected with feeder pipes 31. The feeder pipes 31 are respectively formed with perforations to spray the acid from the top of the tank 11 downwardly into the disintegration and mixing zone.

After the gas has given up its ammonia, it discharges out of the top of the tank into a discharge main 33 which carries the gas to an acid separator 34 for removing any excess acid from the gas. From the acid separator 34 the gas discharges through an outlet 35 for further industrial treatment or use. The excess acid recovered from the gas in the separator 34 is returned to the manifold 30 through a return acid line 36.

The ammonium salt precipitated in the tank 11 discharges through its open bottom 37 into a sump 38 located beneath and communicating with the bottom of the tank 11. As shown in Fig. 1 the sump 38 is provided with an inclined bottom 39 which carries the precipitated ammonium salt and the excess acid to a salt ejector 40 which projects into the sump. The salt ejector is of the usual type provided with a compressed air line 41 for forcing the excess acid and salt upwardly through the ejector pipe 42. From the ejector pipe 42 the salt and excess acid discharges into a feed pipe 43 and the latter discharges the mixture of salt and excess acid on to a drain table 44 of the usual type for draining off the excess acid which is returned to the manifold 30 by means of a return acid line 45. The drain table 44 is provided with a pair of spouts 46 which respectively lead to centrifugal driers 47. Any other acid separated in the driers 47 passes through return pipes 48 to an acid well 49 which also receives the drainage from the lower end of the drain table 44, such drainage discharging into the well 49 through a discharge pipe 50. From the acid well 49 the drainage passes through a pipe 51 back to the sump 38 from which the drainage is recirculated through the system and further available acid separated out and returned to the supply manifold 30.

As shown in Fig. 2, there is preferably provided a pair of salt ejectors for each sump. The salt ejectors individually discharge into separate drain tables and the four spouts of the two drain tables feed three centrifugal driers. The construction and arrangement of the salt ejector, acid drainage and drying apparatus is however immaterial to the present invention and is illustrated and described herein only for the purpose of showing one way of disposing of the ammonium salt and utilizing the excess acid.

The invention as hereinabove set forth is embodied in a particular form of construction but may be variously embodied within the scope of the claims hereinafter made.

I claim:

1. In an ammonia saturator apparatus, in combination: a tank supplied with inlet and outlet means for an ammonia charged gas and also having provision for introducing a supply of an ammonia absorbing acid into said tank; fixed disintegrator members projecting inwardly from opposite walls of said tank and arranged in a plurality of spaced curvilinear series; a rotor mounted within the tank and also provided with a plurality of disintegrator members arranged in spaced curvilinear series, the last named movable series of disintegrator members alternating with and lapping the aforesaid series of fixed disintegrator members and operating conjointly therewith to whirl and to disintegrate the introduced acid and gas into an intimate admixture, from which an ammonium salt is directly precipitated in the tank; and means for ejecting the precipitate from said tank; substantially as specified.

2. In an ammonia saturator apparatus, in combination: a tank supplied with inlet and outlet means for an ammonia charged gas and also having provision for introducing a supply of an ammonia absorbing acid into said tank; fixed disintegrator members projecting inwardly from opposite walls of said tank and arranged in a plurality of spaced curvilinear series; and a rotor mounted within the tank and also provided with a plurality of disintegrator members arranged in spaced curvilinear series, the last named movable series of disintegrator members alternating with and lapping the aforesaid series of fixed disintegrator members and operating conjointly therewith to whirl and to disintegrate the introduced acid and gas into an intimate admixture, from which an ammonium salt is directly precipitated in the tank; substantially as specified.

3. In an ammonia saturator apparatus, in combination: a tank provided with inlet and outlet means for an ammonia charged gas and also having provision for introducing a supply of an ammonia absorbing acid in the form of a spray into said tank; fixed disintegrating members projecting inwardly from opposite walls of said tank and arranged in a plurality of spaced curvilinear series; and a rotor mounted within the tank and also provided with a plurality of disintegrator members arranged in spaced curvilinear series, the last named movable series of disintegrator members alternating with and lapping the aforesaid fixed series of disintegrator members and operating conjointly therewith to whirl and to disintegrate the introduced acid and gas into an intimate admixture from which an ammonium salt is directly precipitated in the tank, substantially as specified.

4. In an ammonia saturator apparatus, in combination: a tank provided with inlet and outlet means for an ammonia charged gas and also having provision for introducing a supply of ammonia absorbing acid into said tank; fixed disintegrator members projecting inwardly from opposite walls of said tank; and a rotor movable within the tank and also provided with a plurality of disintegrator members, the last named movable disintegrator members operating conjointly with the aforesaid fixed disintegrator members to whirl and to disintegrate the introduced acid and gas into an intimate admixture, from which an ammonium salt is directly precipitated in the tank; substantially as specified.

5. In an ammonia saturator apparatus, in combination: a tank; fixed disintegrator members projecting inwardly from opposite walls of said tank; a rotor mounted within the tank and also provided with a plurality of disintegrator members operating conjointly with the aforesaid fixed disintegrator members; means for introducing an ammonia charged gas into the zone immediately surrounding the axis of rotation of the rotor; and means for introducing an ammonia absorbing acid from a point above the periphery of the rotor and for permitting the acid to discharge by gravity into the disintegrating zone; substantially as specified.

6. In an ammonia saturator apparatus, in combination: a chamber; means for introducing an ammonia charged gas and an ammonia absorbing acid, and movable and fixed disintegrator and mixing means in said chamber operable conjointly to disintegrate the acid and gas into an intimate admixture from which an ammonium salt is directly precipitated in said chamber; substantially as specified.

7. In an ammonia saturator apparatus, in combination: a chamber; means for concurrently introducing ammonia charged gas and an ammonia absorbing acid, and means in said chamber for disintegrating the acid and gas into an intimate admixture from which an ammonium salt is directly precipitated in said chamber; substantially as specified.

8. In an ammonia saturator apparatus, in combination: a chamber; means for introducing ammonia charged gas and an ammonia absorbing acid, and self-contained means in said chamber for producing a whirling mixture of the acid and gas, to effect absorption of ammonia from the gas and from which an ammonium salt is directly precipitated in said chamber; substantially as specified.

9. In an ammonia saturator apparatus, in combination: a chamber; means for continuously introducing ammonia charged gas and an ammonia absorbing acid, and jointly operating movable and fixed mixing means in said chamber for effecting a whirling mixture of the acid and gas to absorb the ammonia from the gas and from which whirling mixture an ammonium salt is directly precipitated in said chamber; substantially as specified.

10. In a gas saturator apparatus in combination: a chamber; means for effecting concurrent introduction therein of a gas containing impurities and of a medium adapted to re-act upon said impurities to produce a solid compound; and disintegrator means for disintegrating and commingling said impure gas and said medium to effect formation of said compound and its precipitation as formed; substantially as specified.

11. In a gas saturator apparatus, in combination: a chamber; means for effecting continuous introduction therein of a gaseous mixture to be separated into its constituents and of a medium adapted to re-act upon a constituent of said mixture to produce a solid compound; and disintegrator means for disintegrating and mixing said gaseous mixture and medium to effect continuous formation and precipitation of said solid compound to thereby effect separation of the gaseous mixture into its constituents; substantially as specified.

JOSEPH BECKER.